UNITED STATES PATENT OFFICE.

WILLIAM MELVILLE, OF MANCHESTER, ENGLAND.

SUBSTITUTE FOR OIL-CLOTH OR LINOLEUM.

No. 828,623.      Specification of Letters Patent.      Patented Aug. 14, 1906.

Application filed June 2, 1905. Serial No. 263,472.

*To all whom it may concern:*

Be it known that I, WILLIAM MELVILLE, a subject of the King of Great Britain and Ireland, and a resident of Manchester, England, have invented a new Article of Manufacture for Use as a Substitute for Oil-Cloth or Linoleum, of which the following is a specification.

This invention has for its object to produce a material which will serve as a substitute for oil-cloth or linoleum, but be much cheaper, while being almost if not quite as durable.

According to the invention I employ as the body of the new material fibrous-pulp paper commercially known as "backing," which is made from textile material of long staple, and is close-grained and tough. This material in any suitable length, width, and thickness I treat with a filling and stiffening substance consisting of an emulsion of oil, water, size, lime, and soda, the emulsion being prepared in the following manner, viz: In a mixer, such as is commonly used for mixing colors, the oil and water are placed along with the size. The stirrer is then set in motion, and while the ingredients are being mixed the soda and lime are added until a cream-like emulsion is produced. For oils with little grease in them the lime may be omitted.

The manner of treating the material is as follows: The emulsion is placed ready made in a large vat, in the lower part of which are three rollers, one near each bottom corner and one in the center. Above one edge of the vat is a pair of rollers, and above the other edge is a carrier-roller. The end of the material to be treated is led over this last-named roller, then down and through the liquid in the vat, passing under and over the rollers at the bottom of the vat, and then passing between the two rollers on the other side of the vat. These latter, being driven by gearing, pull the material through the liquid, the rate of traverse being such as to insure the thorough saturation of the material. After leaving the vat the material passes over drying-cylinders or is festooned and allowed to hang in a heated room until dry, or it goes forward after an extended traverse to the next treatment. This latter consists in coating the material back and front or front only with oils and staining colors of the required shade. After drying and if a plain material is required the material is ready for use. If, however, a pattern is required, the material is then printed with the desired pattern in like manner to ordinary oil-cloth.

The proportions of the ingredients which I have successfully employed in my experiments are as follows, in one hundred parts, by weight: oil, (preferably linseed,) sixty-seven parts; water, twenty-five parts; size, (gelatin glue or the like,) five parts; soda, (sodium carbonate,) one and one-half parts; lime, (calcium oxid,) one and one-half parts.

The object and effect of passing the material through the oil emulsion are to fill all the pores or interstices of the material, and thus render it non-absorbent, and thus incapable of absorbing the subsequent coatings of oil-colors, for without such treatment the colors would sink in and become "dead," whereas with the material prepared as aforesaid they remain on the surface and give as good an effect as printed linoleum.

With a closely-grained material the filling liquid requires to be somewhat of thin consistency; but for an open-grained material it will require to be of thicker consistency, more water being used and less oil, or vice versa, according to the readiness with which the material absorbs the emulsion. The soda and lime are varied to suit the readiness of the water and oil to mix and with the greasiness of the oil; but the proportions before named will usually serve. While preferring to apply the said filling preparation to the fibrous paper after the paper is made, it may be applied during the course of its manufacture—that is to say, while in a state of pulp—the pulp and the filling material being well mixed prior to the pulp passing to the paper-making machine.

What I claim is—

A material for use as a substitute for oil-cloth and linoleum consisting of fibrous-pulp paper, impregnated with an emulsified filling of oil, water and size, and after impregnation printed with ordinary oils and colors, substantially as set forth.

In witness whereof I have hereunto set my hand in the presence of two witnesses.

WILLIAM MELVILLE.

Witnesses:
     JOHN CAMP,
     PICKLES D. BAILEY.